United States Patent
Li et al.

(10) Patent No.: US 11,062,199 B2
(45) Date of Patent: Jul. 13, 2021

(54) FRAUDULENT TRANSACTION DETECTION METHOD BASED ON SEQUENCE WIDE AND DEEP LEARNING

(71) Applicant: CHINA UNIONPAY CO., LTD., Shanghai (CN)

(72) Inventors: Xurui Li, Shanghai (CN); Jianbin Zheng, Shanghai (CN); Jintao Zhao, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 17/040,144

(22) PCT Filed: Mar. 19, 2019

(86) PCT No.: PCT/CN2019/078577
§ 371 (c)(1),
(2) Date: Sep. 22, 2020

(87) PCT Pub. No.: WO2019/179403
PCT Pub. Date: Sep. 26, 2019

(65) Prior Publication Data
US 2021/0027145 A1    Jan. 28, 2021

(30) Foreign Application Priority Data
Mar. 22, 2018   (CN) .......................... 201810239759.3

(51) Int. Cl.
*G06N 3/04*   (2006.01)
*G06K 9/62*   (2006.01)
(Continued)

(52) U.S. Cl.
CPC ......... *G06N 3/0454* (2013.01); *G06K 9/6232* (2013.01); *G06K 9/6256* (2013.01);
(Continued)

(58) Field of Classification Search
CPC ............ G06N 3/04; G06N 3/063; G06N 5/00; G06N 3/0454; G06N 5/003; G06K 9/62;
(Continued)

(56) References Cited

U.S. PATENT DOCUMENTS 8,838,755 B2 * 9/2014 Sanghvi .............. H04L 41/0893
709/221
2016/0321777 A1 * 11/2016 Jin ........................ G06N 3/0454
(Continued)

FOREIGN PATENT DOCUMENTS

| CN | 104679777 A | 6/2015 |
| CN | 105095238 A | 11/2015 |

OTHER PUBLICATIONS

International Search Report dated Jun. 3, 2019 issued in PCT/CN2019/078577.
Written Opinion dated Jun. 3, 2019 issued in PCT/CN2019/078577.

*Primary Examiner* — Li Wu Chang
(74) *Attorney, Agent, or Firm* — Scully Scott Murphy & Presser

(57) ABSTRACT

A fraudulent transaction detection method comprises: performing feature mapping processing on each of a plurality of transaction data to generate corresponding feature vectors; converting the feature vectors of a transaction to be detected into integrated feature vectors based on a first self-learning model; respectively converting the feature vectors respectively of at least one time sequence transaction into time sequence feature vectors based on a second self-learning model; combining the integrated feature vectors and each of the time sequence feature vectors corresponding to each of the time sequence transactions to form depth feature vectors; classifying the depth feature vectors based on a third self-learning model to determine whether the transaction to be detected is a normal transaction or a fraudulent transaction.

10 Claims, 1 Drawing Sheet

(51) Int. Cl.
     *G06N 3/063*     (2006.01)
     *G06N 5/00*     (2006.01)
     *G06Q 20/40*     (2012.01)

(52) U.S. Cl.
     CPC ............. *G06N 3/063* (2013.01); *G06N 5/003* (2013.01); *G06Q 20/4016* (2013.01)

(58) Field of Classification Search
     CPC .. G06K 9/6271; G06K 9/6232; G06K 9/6256; G06K 9/6288; G06Q 20/40; G06F 16/20
     See application file for complete search history.

(56) References Cited

U.S. PATENT DOCUMENTS

| | | | |
|---|---|---|---|
| 2019/0182516 A1* | 6/2019 | Li | H04N 21/2668 |
| 2019/0236609 A1* | 8/2019 | Li | G06N 5/046 |
| 2019/0250626 A1* | 8/2019 | Ghafarianzadeh | G06K 9/6282 |
| 2020/0175053 A1* | 6/2020 | Zheng | G06N 3/0454 |

\* cited by examiner

FRAUDULENT TRANSACTION DETECTION METHOD BASED ON SEQUENCE WIDE AND DEEP LEARNING

CROSS-REFERENCE TO RELATED APPLICATIONS

This application is a national application of PCT/CN2019/078577 filed on Mar. 19, 2019, and claims priority to and the benefit of Chinese Patent Application No. 201810239759.3 filed on Mar. 22, 2018. The afore-mentioned patent applications are hereby incorporated by reference in their entireties for all purposes.

FIELD OF THE INVENTION

The present disclosure relates to the technical field of fraudulent transaction detection.

BACKGROUND

Currently, fraudulent transactions often occur, and fraudulent transaction detection models based on machine learning algorithms are playing an increasingly important role. These fraudulent transaction detection methods, although employ machine learning methods, mostly employ static training methods, whether supervised or unsupervised. That is, these methods always take each transaction as a separate individual, and the work done by the algorithm is simply training the individual features of the transaction in a horizontal/traverse/horizontal dimension, with little consideration of longitudinal association between transaction sequences. However, the longitudinal association factors between these sequences are likely to have a significant impact on the final output result of the model. For example, prior to the occurrence of a large fraudulent transaction, criminals often make a certain number of small tentative transactions firstly; alternatively, the transaction behavior of a stolen account in a short time significantly deviates from the historical transaction behavior of the account and the like.

In another aspect, some existing sequence analysis methods focus on the longitudinal relationship between sequence elements, but for intra-sequence features, the learning capability in the horizontal dimension is deficient, which also affects the precision of the fraudulent transaction detection model to a large extent.

SUMMARY

The present disclosure provides a fraudulent transaction detection method that achieves a balance between aspects of machine learning in transverse dimension features and longitudinal dimension features.

To achieve the above purpose, the embodiments provide a technical solution as follows:

a fraudulent transaction detection method based on sequence wide and deep learning, comprising: a) performing feature mapping processing on each of a plurality of transaction data to generate corresponding feature vectors; b) converting the feature vectors of a transaction to be detected into integrated feature vectors based on a first self-learning model; c) respectively converting the feature vectors respectively of at least one time sequence transaction into time sequence/time sequence feature vectors based on a second self-learning model; wherein the time sequence transaction represents a transaction conducted within a first time period by a transaction account for the transaction to be detected; d) combining the integrated feature vectors and each of the time sequence feature vectors corresponding to each of the time sequence transactions to form depth feature vectors; and e) classifying the depth feature vectors based on a third self-learning model to determine whether the transaction to be detected is a normal transaction or a fraudulent transaction.

The embodiments also disclose a fraudulent transaction detection system based on sequence wide and deep learning, comprising: a feature mapping processing unit for performing feature mapping processing on data of a plurality of transactions to generate a plurality of sets of corresponding transaction feature vectors; a first self-learning unit coupled with the feature mapping processing unit and for converting the feature vectors of a transaction to be detected into integrated feature vectors; a second self-learning unit coupled with the first self-learning unit and for respectively converting the feature vectors respectively of at least one time sequence transaction into time sequence feature vectors; wherein the time sequence transaction represents a transaction conducted within a first time period by a transaction account for the transaction to be detected; a time sequence feature combining unit coupled with the first self-learning unit and the second self-learning unit respectively, and for combining the integrated feature vectors and each of the time sequence feature vectors corresponding to each of the time sequence transactions to form depth feature vectors; and a third self-learning unit, coupled with the time sequence feature combining unit, for classifying the depth feature vectors to determine whether the transaction to be detected is a normal transaction or a fraudulent transaction.

The fraudulent transaction detection method and system disclosed by the embodiments carry out machine learning in terms of not only horizontal dimension features, but also longitudinal dimension features, which takes into consideration various factors, and in turn achieves balance between the two dimensions, enabling effective improvement of the detection precision of fraudulent transactions through the fraudulent transaction detection model. Meanwhile, the user can perform appropriate parameter adjustment and manual intervention on such model, so that the model is suitable for various occasions.

DETAILED DESCRIPTION

Specific details are set forth in the following description in order to provide a thorough understanding of the embodiments. However, it will be apparent to those skilled in the art that embodiments may be practiced without these specific details. In the embodiments, specific numerical references, such as "first element", "second apparatus" and the like, may be made. However, specific numerical references should not be taken as necessarily being subject to the literal ordering thereof, but rather should be taken as the "first element" being distinct from the "second element".

The specific details set forth by embodiments are exemplary only, and the specific details may be varied while still falling within the spirit and scope of the invention. The term "couple" is defined to mean either directly connected to an assembly or indirectly connected to the assembly via another assembly.

Preferred embodiments of methods, systems, and apparatus suitable for carrying out are described below with reference to the accompanying drawings. While embodiments are described with respect to a single combination of elements, it should be understood that embodiments include all possible combinations of the disclosed elements. Therefore, if one embodiment includes elements A, B, and C, while another embodiment includes elements B and D, embodiments should also be considered to include other remaining combinations of A, B, C, or D, even if not specifically disclosed.

Figure 1:
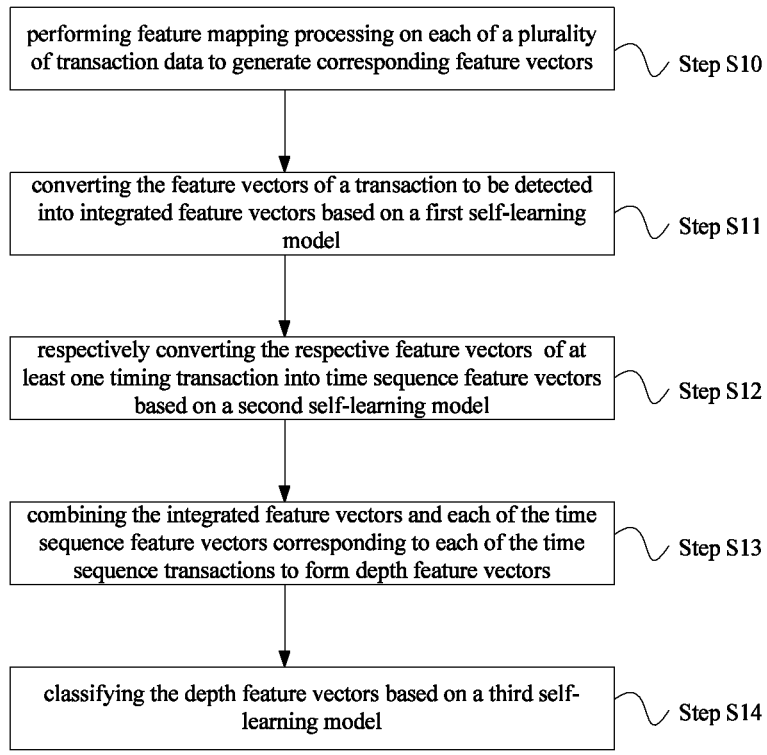
FIG. 1 illustrates a flowchart of a fraudulent transaction detection method based on sequence wide and deep learning in accordance with an embodiment.

As shown in FIG. 1, one embodiment provides a fraudulent transaction detection method based on sequence wide and deep learning comprising the following steps S10-S14. It should be understood, however, that the combination, omitting, or altered order of execution of these steps, including parallel execution of these steps, possibly made by those skilled in the art on basis of deep understanding of the present invention should be within the protective scope of the present invention.

Step S10, perform feature mapping processing on each of a plurality transaction data to generate a corresponding feature vector.

Specifically, feature mapping processing is performed on raw transaction data, feature of interest may include consumption type, transaction time and location, transaction amount, transaction frequency, transaction account type, registration time, and the like. In accordance with embodiments, it is also required to combine them for further statistical processing. As an example, statistical engineering may be performed to gather statistics on, for example, correlated variables of a current transaction, correlated variables of a last transaction, time length statistics, and trusted feature variables, and the like. All of the data corresponding to these variables require a series of pre-processing, such as mapping encoding, to transition to a numerical variable. Eventually, each transaction is mapped to a multi-dimensional feature vector.

Step S11, convert the feature vector of the transaction to be detected into an integrated feature vector based on a first self-learning model.

In this step, a first self-learning model is first trained using a full amount of samples of a single transaction, and then the multi-dimensional feature vector of each transaction is converted into an integrated feature vector using the model, the integrated feature vector including not only information of the original multi-dimensional feature vectors, but also resultant additional information from statistical analysis of the original multi-dimensional feature vectors. Further, the integrated feature vector may be combined with one or more manually extracted feature vectors to form a combined feature of a single transaction.

Step S12, convert the feature vector of each of at least one time sequence transaction into a time sequence feature vector respectively based on a second self-learning model. Wherein the time sequence transaction represents a transaction conducted within a first time period by the transaction account for the transaction to be detected.

After the integrated features (or combined features) of the single transaction is obtained in the previous step S11, the integrated features (or combined features) of the current transaction are augmented according to the information of the first N historical transactions (i.e., the time sequence transaction) of the respective transaction account in step S12, 0 is used for populating in case that the number of time sequence transactions that is less than N, and is labeled by a label corresponding to the current transaction (the transaction to be detected). Specifically, after such augmentation, the second self-learning model will be trained such that the second self-learning model adjusts internal parameters by learning so that the time sequence transaction information can be converted to a time sequence feature vector. After the learning is completed, the corresponding number of time sequence features can be obtained through the second self-learning model based on the N time sequence transactions corresponding to the transactions to be detected.

As a further improvement, the second self-learning model includes a first number of sub-models, each sub-model go through independent training learning respectively, wherein the first number is consistent with the number of times of transactions conducted within the first time period by the transaction account for the transaction to be detected. In other words, for each transaction to be detected, whether as a learning sample or for actual detection, its first time sequence transaction will utilize the first sub-model for training learning and detection, its second time sequence transaction (e.g., transaction further away from the transaction to be detected in time) will utilize the second sub-model for training learning and detection, and so on.

This improvement is based on the consideration that, in some applications, the time sequence sub-models corresponding to multiple different time windows need to be trained according to historical transaction distribution information, while the output dimensions of all the time sequence sub-models are uniform. In this case, in the horizontal comparison (i.e. comparison between different transactions to be detected), calculation of unified scale can be performed on a particular time sequence transaction corresponding to each transaction to be detected (e.g., a historical transaction that is closest to the transaction to be detected in time); and in the longitudinal comparison (i.e. comparison between different time sequence transactions corresponding to a certain transaction to be detected), calculation of different scales can be performed so that different time sequence transactions obtain different weights (i.e. weights occupied by depth feature vectors).

Step S13, combine the integrated feature vector with each time sequence feature vector corresponding to each time sequence transaction to form a depth feature vector.

Preferably, between the second self-learning model and the third self-learning model, a multi-layer neural network is provided for combining the integrated feature vector with each time sequence feature (vector) and outputting the generated depth feature vector to the third self-learning model. In addition to being used to combine the integrated feature vector with the corresponding time sequence feature vector, the multi-layer neural network may also be used to control the vector length of the depth feature vector.

Further, by introducing a "feature layer" and an "assembly layer" attention module at a particular location, the model is enabled to actively learn the influence weight of each time sequence feature on the current transaction feature (integrated feature or combined feature), and the influence weight of each sub-model on the last obtained depth feature vector, and to avoid overfitting risk to a certain extent.

As one example, a feature layer attention module is provided between the first self-learning model and the second self-learning model for actively learning the influence weight of the time sequence transaction on the transaction to be detected in the depth feature vector.

As another example, an assembly layer attention module is also included in the second self-learning model, such that the second self-learning model can actively learn the influence weights of the respective time sequence transactions on the depth feature vectors, respectively.

Step S14, classify the depth feature vectors based on the third self-learning model to determine whether the transaction to be detected is a normal transaction or a fraudulent transaction.

After obtaining the depth feature vector corresponding to each of the transactions to be detected, each transaction becomes a sample independent of each other. The ordering between samples may be randomly shuffled and then a portion of the data is selected as a training set to train the top later classifier.

The structure model of obtaining width features firstly with integrated learning, then performing deep optimization on the width features through sequence learning, and finally performing width optimization on the depth features through integrated learning, is referred to herein as a "wide-deep-wide" structure model.

The classifier employed in step S14 may have a variety of options, for example, a random forest is selected as a top layer classifier. After the random forest classifier is trained, a final fraudulent transaction detection model is obtained. After the training is completed, partial transaction data is used for testing, so that the final model effect can be verified.

As one specific example, the first self-learning model described above may employ a gradient boosted decision tree model, while the second self-learning model may choose to use a recurrent neural network model.

Preferably, the random forest model in step S14 adjusts the parameters of the model itself based on the precision and coverage of the determination of the fraudulent samples. The precision represents the ratio between the number of transactions that are identified as indeed fraudulent transactions and the total number of transactions that are identified as fraudulent transactions. The coverage represents the ratio between the number of transactions that are identified as indeed fraudulent transactions and the number of actual fraudulent transactions in the samples.

A more specific implementation of the first self-learning model in a particular scenario is described below.

A gradient boosted decision tree (GBDT) is used to generate integrated feature vectors which is based on boosting concepts in integrated learning, and a decision tree is constructed in the gradient direction that reduces the residual during each iteration, and the number of constructed decision trees equals to the number of iterations. The concept of GBDT enables it to have natural advantage to discover a variety of distinguishing features and combinations of features, eliminating the step of manually finding features and combinations of features. For the tree in front of GBDT, the feature splitting mainly embodying features with differentiation for most samples; for the tree after GBDT, it primarily embodies a few samples remaining with a relatively large residual after going through the first N trees. The features with differentiation in a whole are preferentially selected, then the features with differentiation for a few samples are selected, which is also the reason for embodiments to choose a GBDT instead of a random forest for feature integration.

A more specific implementation of the second self-learning model provided by one embodiment described above in a particular scenario is described below.

S201, select and acquire fraudulent samples in a period of time T. Count to obtain that the number of transaction accounts corresponding to the fraudulent samples in the period of time is up to C.

S202, randomly extract normal transaction accounts not in the fraud set from the historical transaction data within the time period T. Count the transaction number corresponding to each transaction account, and if the transaction number corresponding to a transaction account is greater than a threshold value (e.g., 1000), the account is excluded from the candidate set, until the number of normal transaction accounts also reaches N*C. Wherein N is the imbalance ratio.

S203, combine the historical transactions with the transaction account number as a key, and then count the historical transaction number corresponding to each transaction account number.

S204, the transaction set corresponding to the transaction account number is also divided into k sets according to the size of the transaction number corresponding to each transaction account, and this can be performed by a clustering method. Specifically, assuming that the number of transactions for a single account within time T has a minimum of the S1, and a maximum of Ek, then the range of [Sk, Ek] is divided into k sets equivalently according to a log 10 conversion coordinate, the range size of which is [S1, E1], [S2, E2], . . . , [Sk, Ek] from smallest to largest. For each [Si, Ei] interval range, the time window of its corresponding time sequence sub-model is set to the left boundary value Si. For the account number belonging to the set, if the number of transactions is greater than Si in an earlier stage for the current transaction, time sequence sample augmentation is carried out according to the first Si transactions.

As an example, if it is found that the number of accounts with a single account transaction number of less than 40 is relatively large, the corresponding account number may be associated with a time sequence sub-model where the time window increments five times, respectively. For an account number with a single account transaction number of more than 40, since the total number of such accounts is relatively small, the time window is uniformly used as the unified time sequence sub-model of the lowest value 40 within the interval under the condition that doing finer division on the time window is of low cost efficiency.

After the above steps S201-204, in the ith ($1<=i<=k$) set, each transaction account has Si-Ei corresponding transactions, and these transactions are ordered in a sequence of earlier to later in time. Next, to depth augmentation is performed for each transaction of the account.

S205, for a certain transaction account and for the earliest transaction of this account, the original transaction vector is an n-dimensional vector $X1=\{X11, x12, \ldots, X1n\}$. The goal is to augment each transaction into a fixed (n*Ei+1)-dimensional vector. For example, for a first transaction, there is no transaction in the earlier stage, so the first (n*Ei−1)-dimensional vectors are populated with 0, and finally a tag Y1 about whether the transaction is fraudulent is added, forming the first sample of $\{0, \ldots, 0, X1, Y1\}$. For a second transaction, the most original vector is $X2=\{X21, X22, \ldots, X2n\}$. For the second transaction, the first transaction $X_1$ is its prepended transaction, so it is added to the left side of the original vector, the vector of the second transaction is thus mapped to the second sample of $\{0, \ldots, 0, X1, X2, Y2\}$, wherein Y2 is the label about whether the second transaction is fraudulent, and 0 is used to populate a total of (n*Ei−2) dimensions.

S206, next, count how many transactions are made by the transaction account in time T, if it is n and n<Ei, then stop to generate samples after the nth sample is generated. If the account just made Ei transactions in total, then for the for the most recent (Eith) transaction of the account, the transaction is exactly augmented as {X1, . . . , XEi1, XEi, YEi}, which is just (n*Ei+1) dimensions, and therefore there is no need to populate it with 0, YEi being the tag about whether the transaction is fraudulent.

S207, perform model training with GRU network algorithm. Since the number of layers of GRU network is generally not very large, the learning capability for multi-dimensional features among the same transaction is only equivalent to a basic shallow neural network. As such, although the GRU network can learn very well the correlation of features in a particular column between transactions, the learning ability for multi-dimensional features of the same transaction is not very stronger. Herein, only the GRU network is utilized to extract time sequence features between transaction sequences. The specific number of layers may be adjusted according to actual effects and needs, and a 2-layer GRU network is used here.

GRU network algorithms are improvements to methods of recurrent neural networks (RNNs). It will be appreciated by those skilled in the art that the Long Short Term Memory (LSTM) model is a special RNN that uses memory cells in place of S-type activated neurons that are commonly used in the original network and are capable of learning long-term dependency relationships. On this basis, the gate recurrent unit (GRU) combines the forget gate and the input gate in the LSTM model into a single updated gate, so that there are fewer matrix multiplications than in the LSTM, resulting in higher efficiency of the GRU in case of very large amount of training data.

After the above steps S205-S207, deep learning have been well conducted on the time sequence features. Since there are k sets, a total of k models are obtained. For each transaction, it is transitioned into the corresponding depth feature vector through corresponding model learning, while the depth feature vector should be uniform in scale for the k models in order to subsequently perform unified training and testing on all the depth feature vectors. That is, regardless of how many time sequence sub-models are included in the second self-learning model, their final output dimensions are uniform, avoiding tedious calculation respectively done with a plurality of RF classifiers subsequently.

S208, after the last recurrent unit output of the second self-learning model passes through a multilayer neural network MLP, the time sequence features of the transaction to be detected are obtained. A better approach is to superimpose a Mean Pooling layer on the top layer, which can fuse the outputs of each of the previous temporal sub-models and then generate the output of the same dimension after a simple MLP as the final depth feature vector for the current transaction. The "assembly layer" attention module described above may be interposed between the GRU model and the mean pooling layer, and the "assembly layer" attention module enables the mean pooling layer to automatically learn the influence weights of each previous sub-model on the depth feature vector.

A more specific implementation of the third self-learning model in a particular scenario is described below.

Fraudulent transaction detection model requires attention to be paid on the precision and coverage of fraudulent samples at the same time, thus, the embodiment uses Fβ values for the type of fraud to determine the final model parameters and effects, and the Fβ values are calculated as follows:

$$F_\beta = (1 + \beta^2) \cdot \frac{\text{precision} \cdot \text{recall}}{(\beta^2 \cdot \text{precision}) + \text{recall}}$$

Wherein β represents that the weight of the recall is a multiple of precision. Take β=1 as an example, F1 value of the above scheme under several scenes is improved by more than 10% compared to a simple integrated learning model or a deep sequence learning model. When the GRU model (the second self-learning model) is between the GBDT model (the first self-learning model) and the random forest model (the third self-learning model), the detection effect is significantly enhanced, and the effective F1 value may exceed 0.4.

Figure 2:
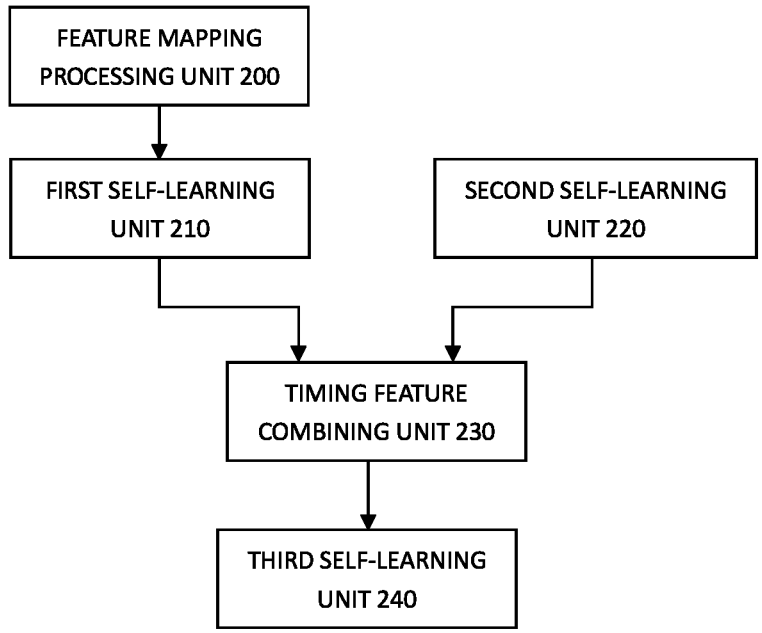
FIG. 2 illustrates a schematic block diagram of a fraudulent transaction detection system based on sequence wide and deep learning in accordance with an embodiment.

As shown in FIG. 2, another embodiment provides a fraudulent transaction detection system based on sequence wide and deep learning that includes a feature mapping processing unit 200, a first self-learning unit 210, a second self-learning unit 220, a time sequence feature combining unit 230 and a third self-learning unit 240.

Specifically, the feature mapping processing unit 200 performs feature mapping processing on the data of multiple transactions to generate a plurality of corresponding sets of transaction feature vectors. The first self-learning unit 210 is communicatively coupled with the feature mapping processing unit 200 for converting the feature vectors of the transaction to be detected into integrated feature vectors. The second self-learning unit 220 is communicatively coupled with the feature mapping processing unit 200 (or coupled with the first self-learning unit 210) for respectively converting the respective feature vectors of at least one time sequence transaction into time sequence feature vectors.

The time sequence feature combining unit 230 is coupled with the first self-learning unit 210 and the second self-learning unit 220, respectively, for combining the integrated feature vectors with respective time sequence feature vectors corresponding to respective time sequence transactions to form a depth feature vector.

The third self-learning unit 240 is coupled with the time sequence feature combining unit 230 for classifying the depth feature vector to determine whether the transaction to be detected is a normal transaction or a fraudulent transaction and finally outputs the detection result.

In some embodiments, at least a portion of the system may be implemented using a set of distributed computing apparatus connected by a communications network, or based on "cloud". In such a system, multiple computing apparatus operate together to provide services using their shared resources.

The implementations based on "cloud" may provide one or more advantages, including openness, flexibility and extendibility, center management, reliability, scalability, the ability to optimize computing resources, to aggregate and analyze information across multiple users, and the ability to connect across multiple geographic areas and use multiple mobile or data network operators for network connectivity.

The above description is only directed to embodiments and is not intended to limit the protective scope of the invention. Various modifications of design may be made by those skilled in the art without departing from the spirit of the invention and the accompanying claims.

What is claimed is:

1. A fraudulent transaction detection method based on sequence wide and deep learning, comprising:
performing feature mapping processing on each of a plurality of transaction data to generate corresponding feature vectors;
converting the feature vectors of a transaction to be detected into integrated feature vectors based on a first self-learning model;
respectively converting the respective feature vectors of at least one time sequence transaction into time sequence feature vectors based on a second self-learning model, wherein the time sequence transaction represents a transaction conducted within a first time period by a transaction account for the transaction to be detected, comprising:
determining the number of transactions conducted within the first time period by the transaction account for the transaction to be detected, and
configuring the second self-learning model to have a first number of sub-models based on the determined number of transactions, each of the sub-models respectively performing independent training learning, wherein the first number is equal to the determined number of transactions;
combining the integrated feature vectors and each of the time sequence feature vectors corresponding to each of the time sequence transactions to form depth feature vectors; and
classifying the depth feature vectors based on a third self-learning model to determine whether the transaction to be detected is a normal transaction or a fraudulent transaction.

2. The method of claim 1, wherein a feature layer attention module is provided between the first self-learning model and the second self-learning model for actively learning an influence weight of the time sequence transaction on the transaction to be detected in the depth feature vectors.

3. The method of claim 1, wherein an assembly layer attention module is further comprised in the second self-learning model, such that the second self-learning model is capable of actively learning influence weights of each of the time sequence transactions on the depth feature vectors, respectively.

4. The method of claim 1, further comprising:
providing a multi-layer neural network between the second self-learning model and the third self-learning model for combining the integrated feature vectors and each of the time sequence feature vectors, and outputting the depth feature vectors.

5. The method of claim 4, wherein the multi-layer neural network is further used for controlling a vector length of the depth feature vector.

6. The method of claim 5, wherein the first self-learning model is a gradient boosted decision tree model, the second self-learning model is a recurrent neural network model, and the third self-learning model is a random forest model.

7. The method of claim 6, wherein the random forest model adjusts parameters of the model based on precision and coverage of determination for fraudulent samples.

8. The method of claim 7, wherein $F_\beta$ value of the random forest model satisfies the following:

$$F_\beta = (1 + \beta^2) \cdot \frac{\text{precision} \cdot \text{recall}}{(\beta^2 \cdot \text{precision}) + \text{recall}}$$

wherein precision is the precision of the determination for the fraudulent samples, recall is the recall of the determination for the fraudulent samples, and β represents that the weight of the recall is a multiple of the precision.

9. A fraudulent transaction detection system based on sequence wide and deep learning, comprising:
a hardware processor being configured to:
perform feature mapping processing on a plurality of transaction data to generate a plurality of sets of corresponding transaction feature vectors;
convert the feature vectors of a transaction to be detected into integrated feature vectors through a first self-learning model;
convert the feature vectors respectively of at least one time sequence transaction into time sequence feature vectors through a second self-learning model, wherein the time sequence transaction represents a transaction conducted within a first time period by a transaction account for the transaction to be detected, by
determining the number of transactions conducted within the first time period by the transaction account for the transaction to be detected, and
configuring the second self-learning model to have a first number of sub-models based on the determined number of transactions, each of the sub-models respectively performing independent training learning, wherein the first number is equal to the determined number of transactions;
combine the integrated feature vectors and each of the time sequence feature vectors corresponding to each of the time sequence transactions to form depth feature vectors; and
classify the depth feature vectors to determine whether the transaction to be detected is a normal transaction or a fraudulent transaction through a third self-learning model.

10. A non-transitory computer-readable medium storing one or more instructions executable by a computer system to implement a fraudulent transaction detection method based on sequence wide and deep learning, the method comprising:
performing feature mapping processing on each of a plurality of transaction data to generate corresponding feature vectors;
converting the feature vectors of a transaction to be detected into integrated feature vectors based on a first self-learning model;
respectively converting the respective feature vectors of at least one time sequence transaction into time sequence feature vectors based on a second self-learning model, wherein the time sequence transaction represents a transaction conducted within a first time period by a transaction account for the transaction to be detected, comprising:
determining the number of transactions conducted within the first time period by the transaction account for the transaction to be detected, and
configuring the second self-learning model to have a first number of sub-models based on the determined number of transactions, each of the sub-models respectively performing independent training learning, wherein the first number is equal to the determined number of transactions;

combining the integrated feature vectors and each of the time sequence feature vectors corresponding to each of the time sequence transactions to form depth feature vectors; and classifying the depth feature vectors based on a third self-learning model to determine whether the transaction to be detected is a normal transaction or a fraudulent transaction.

* * * * *